A. McCULLOUGH.
ANTISKID ATTACHMENT FOR VEHICLE WHEELS.
APPLICATION FILED FEB. 21, 1919.

1,339,854.

Patented May 11, 1920.

Inventor:
A. McCullough
by Lacey & Lacey
Atty's.

UNITED STATES PATENT OFFICE.

ALFRED McCULLOUGH, OF CALLERY, PENNSYLVANIA.

ANTISKID ATTACHMENT FOR VEHICLE-WHEELS.

1,339,854.   Specification of Letters Patent.   Patented May 11, 1920.

Application filed February 21, 1919. Serial No. 278,390.

*To all whom it may concern:*

Be it known that I, ALFRED McCULLOUGH, a citizen of the United States, residing at Callery, in the county of Butler and State of Pennsylvania, have invented certain new and useful Improvements in Antiskid Attachments for Vehicle-Wheels, of which the following is a specification.

This invention relates to an improvement in attachments for vehicle wheels to prevent slipping and skidding and has as one of its objects to provide an attachment for this purpose which may be readily applied to any automobile or other vehicle wheel when the occasion for its use arises and which may be as readily disconnected when not further required.

Another object of the invention is to provide an attachment of the class described especially designed to effectually prevent slipping and skidding of the wheels when traveling over an icy or muddy roadway so that slippage of the driving wheels will not occur and thus enabling the machine to be driven over such roadways without loss of power and as readily as over roadways in their normal condition.

A further object of the invention is to so construct the attachment that it may be readily applied without the use of tools to any of the ordinary types of anti-skid chains now employed upon automobile wheels so that the use of independent fastening or anchoring devices for the attachment is obviated.

Figure 1:
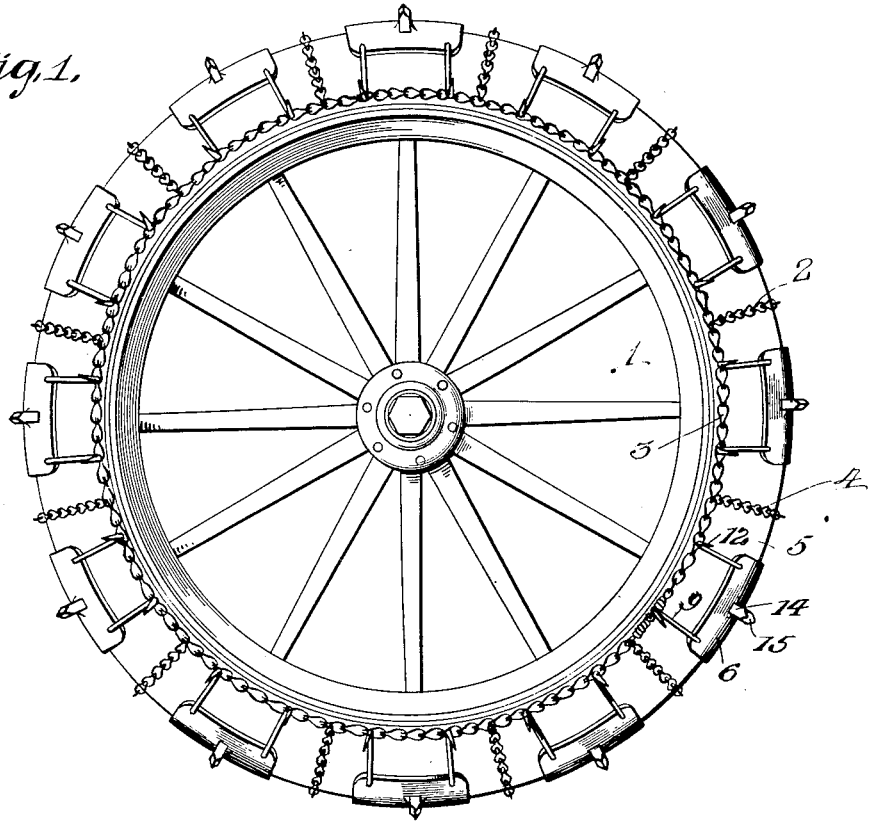
Figure 1 is a side elevation of an automobile wheel equipped with a number of the devices embodying the present invention.
Figure 2:
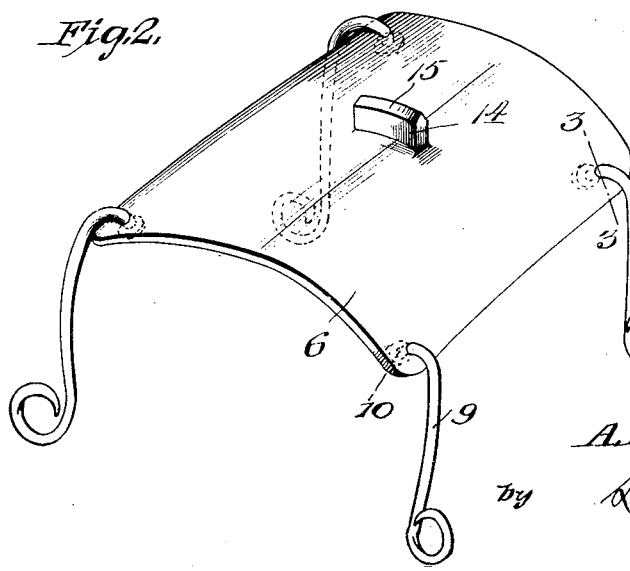
Fig. 2 is a perspective view of one of the devices detached from the wheel.
Figure 3:
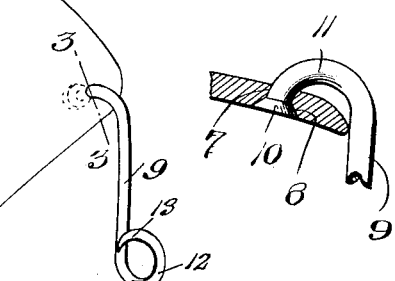
Fig. 3 is a vertical longitudinal sectional view taken substantially on the line 3—3 of Fig. 2.

In the drawings the numeral 1 indicates in general an automobile wheel of the ordinary type and the numeral 2 indicates an ordinary anti-skid chain which is applied to the wheel, said chain comprising side members 3 disposed at the opposite sides of the felly of the wheel, and transverse members 4 extending between the side members 3 and about the tread of the tire which is indicated by the numeral 5. Anti-skid chains are effective on wet roads and roads covered with snow but are not so effective where relatively deep mud holes are encountered or where the roadway is covered with ice and it is with the object in view of enabling a car to be driven over icy and muddy roads that the auxiliary anti-skidding device embodying the present invention is provided.

Each of the devices embodying the invention comprises a shoe indicated by the numeral 6 and preferably in the form of a plate transversely curved to conform substantially to the transverse curvature of the tread of the tire of the wheel to which the device is to be applied. These plates will be of such width as to completely embrace the tread portion proper of the tire but each plate will be relatively short so that a number of the devices may be applied to a single wheel in a series extending circumferentially thereof as shown in Fig. 1 of the drawings. At each of its four corners the shoe 6 is formed with an opening indicated by the numeral 7 and these openings are countersunk or flared at their ends which open through the inner face of the shoe 6 as indicated by the numeral 8. The openings 7 are designed to receive the anchoring members for the shoe and each of these members comprises a link 9 which at one end is fitted through the opening 7 and is formed with a beveled head 10 to seat within the countersink 8 of the respective opening and thus lie flush with the inner face of the shoe 6 so that an entirely smooth surface will be presented to the tire thus avoiding any wear upon the tire through the presence of the attachment. Adjacent its headed end, the link 9 is bent as at 11 so as to extend from the opening 7 over the adjacent lateral edge of the shoe. The link at its opposite end is bent to form an eye 12 the terminal portion 13 of which is laterally offset with relation to the body portion of the link as clearly shown in Fig. 1 of the drawings so that the eye may be readily engaged with the links of the anti-skid chain 2. The inner ends of the links 9, of course, fit pivotally in the respective openings 7 so that each link may have a certain amount of play in engaging its hooked end with the links of the anti-skid chain. In attaching the device to the wheel or more specifically to the chain, the anchoring links 9 at one side of the attachment are first engaged with the links of the anti-skid chain 2 at the inner side of the wheel after which the shoe 6 is firmly positioned against the tread portion of the tire and finally the hooked ends of the links at the opposite side of the shoe are engaged with the links of the said chain 2 at the outer side of the wheel, the chain being pulled taut in the meanwhile so that the shoes will be held more or less snugly to the tire.

Each shoe 6 is provided centrally with a transversely extending calk 14 having a sharpened or beveled engaging edge 15 which may be straight or which may extend on a curved line from end to end either as desired. Ordinarily this calk 14 will be considerably narrower than the shoe 6 but its width may be increased in proportion to the width of the shoe if found desirable.

With a number of the attachments applied to the anti-skid chain of a wheel, it will be evident that the calks 14 in the rotation of the wheel, will not only dig into and obtain a firm purchase in an icy road surface but they will also constitute mud lugs in traveling over muddy road surfaces, and in both instances slipping or skidding of the wheels will be effectually prevented.

It will be understood from the foregoing that by pivotally engaging the headed ends of the links 9 in their respective openings in the shoe 6 of the attachment, the hooked ends of the links may be swung to position to engage selected ones of the links of the anti-skid chain so that if the engagement of the end of a link in one link of the chain would permit the shoe to sag away from the tire, the link 9 may be swung so as to provide for the engagement of its hooked end in a more removed link. It will also be understood that the hooked ends of the links constitute in effect eyes instead of open hooks inasmuch as their terminals are located opposite and relatively close to the main portions of the respective links 9 although sprung or offset laterally so as to adapt these ends of the links for engagement with the links of the anti-skid chain and as a result there is no likelihood of the links 9 becoming disengaged from the links of the said chain.

Having thus described the invention, what is claimed as new is:

An anti-skid attachment for a wheel chain comprising a shoe for disposal against the outer surface of a tire, the shoe being provided at its opposite sides with openings, and anchoring links pivotally fitted at one end through the openings and having heads countersunk in the openings and flush with the inner surface of the shoe, the links being provided at their other ends with means for engagement with the links of such a chain.

In testimony whereof I affix my signature.

ALFRED McCULLOUGH.